(12) United States Patent
Wang

(10) Patent No.: US 11,803,745 B2
(45) Date of Patent: Oct. 31, 2023

(54) TERMINAL DEVICE AND METHOD FOR ESTIMATING FIREFIGHTING DATA

(71) Applicant: Fulian Precision Electronics (Tianjin) Co., LTD., Tianjin (CN)

(72) Inventor: Shih-Cheng Wang, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 820 days.

(21) Appl. No.: 16/844,335

(22) Filed: Apr. 9, 2020

(65) Prior Publication Data

US 2021/0182668 A1    Jun. 17, 2021

(30) Foreign Application Priority Data

Dec. 11, 2019  (CN) .......................... 201911277669.4

(51) Int. Cl.
| | |
|---|---|
| *G06N 3/08* | (2023.01) |
| *G06N 3/082* | (2023.01) |
| *G06V 10/764* | (2022.01) |
| *G06V 10/82* | (2022.01) |
| *G06V 20/52* | (2022.01) |
| *G06N 3/0464* | (2023.01) |
| *A62C 2/00* | (2006.01) |
| *A62C 99/00* | (2010.01) |

(52) U.S. Cl.
CPC ................ *G06N 3/08* (2013.01); *A62C 2/00* (2013.01); *A62C 99/009* (2013.01); *G06N 3/0464* (2023.01); *G06N 3/082* (2013.01); *G06V 10/764* (2022.01); *G06V 10/82* (2022.01); *G06V 20/52* (2022.01)

(58) Field of Classification Search
CPC ...... G06N 3/08; G06N 3/0454; G06N 3/0464; G06V 20/52; G06V 10/764; G06V 10/82
See application file for complete search history.

(56) References Cited

U.S. PATENT DOCUMENTS

| | | | |
|---|---|---|---|
| 2005/0055249 A1 | 3/2005 | Helitzer et al. | |
| 2018/0053401 A1* | 2/2018 | Martin | .................... H04L 67/10 |
| 2019/0012904 A1* | 1/2019 | Yusuf | ..................... G06N 3/048 |
| 2022/0233129 A1* | 7/2022 | Liu | ........................ G06N 3/063 |

FOREIGN PATENT DOCUMENTS

CN          110046837 A       7/2019

* cited by examiner

*Primary Examiner* — Li B. Zhen
*Assistant Examiner* — Tirumale K Ramesh
(74) *Attorney, Agent, or Firm* — ScienBiziP, P.C.

(57) ABSTRACT

A method for estimating firefighting data includes: obtaining firefighting condition data of a site, wherein the firefighting condition data comprises information on firefighting equipment, information on flammable articles; and estimating firefighting input data and firefighting damage data based on the firefighting condition data using a simulation analysis model, wherein the simulation analysis model is created based on firefighting condition data, firefighting input data and firefighting damage data of different sites.

15 Claims, 4 Drawing Sheets

---

Obtain firefighting condition data — 21

Estimate firefighting input data and firefighting damage data based on the firefighting condition data using a simulation analysis model — 22

TERMINAL DEVICE AND METHOD FOR ESTIMATING FIREFIGHTING DATA

CROSS-REFERENCE TO RELATED APPLICATIONS

This application claims priority to Chinese Patent Application No. 201911277669.4 filed on Dec. 11, 2019, the contents of which are incorporated by reference herein.

FIELD

The subject matter herein generally relates to a method and a computer device for estimating firefighting data.

BACKGROUND

Sometimes, fire control is based on firefighting data analysis. Firefighting data analysis is used to determine the best plan which minimizes cost and damage while ensuring firefighting safety. Conventional firefighting data analysis is performed based on statistical charts to determine a relationship between costs and damages. The conventional firefighting data analysis is not satisfactory due to low accuracy and inefficiency.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

In order to provide a clear understanding of the objects, features, and advantages of the present disclosure, the same are given with reference to the drawings and specific embodiments. It should be noted that non-conflicting embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art as generally understood. The terms used in the present disclosure are for the purposes of describing particular embodiments and are not intended to limit the present disclosure.

The present disclosure, referencing the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or other storage devices. Some non-limiting examples of non-transitory computer-readable media include CDs, DVDs, BLU-RAY, flash memory, and hard disk drives.

Figure 1:
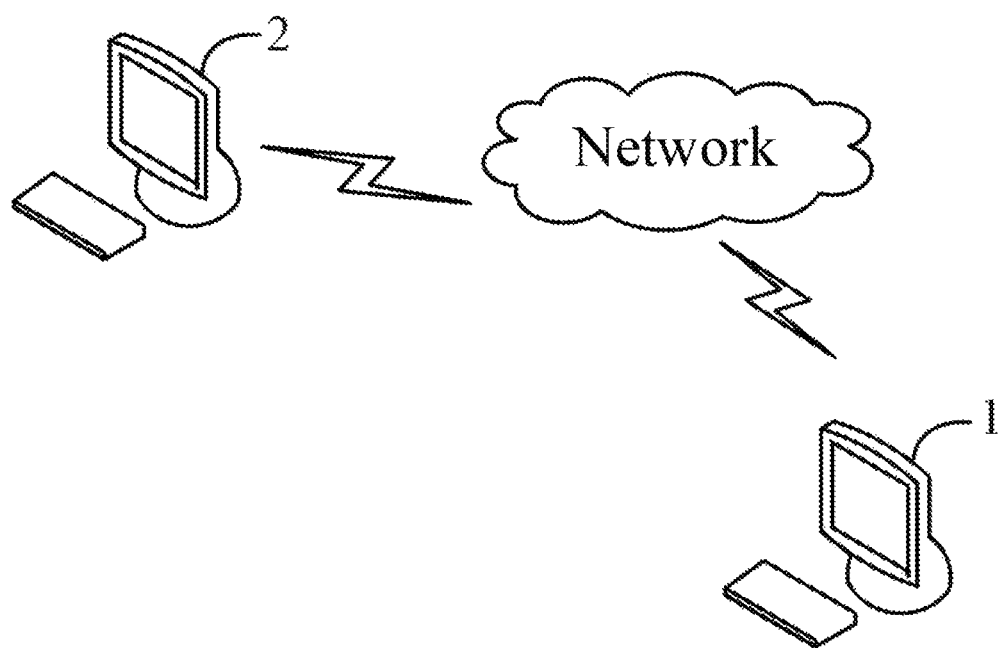
FIG. 1 illustrates an embodiment of an application environment architecture diagram of a method for estimating firefighting data.

FIG. 1 illustrates an application environment architecture diagram of a method for estimating firefighting data. The method is applied in a terminal device 1. The terminal device 1 is in communication with a computer device 2. The terminal device 1 is configured to obtain firefighting condition data of a site, and estimating firefighting input data and firefighting damage data based on the firefighting condition data. The computer device 2 is configured to store firefighting condition data, firefighting input data and firefighting damage data of different sites.

The terminal device 1 can be any electronic devices capable of performing firefighting data estimating, such as personal computers, tablet computers. The computer device 2 can be any electronic devices capable of storing firefighting condition data, firefighting input data and firefighting damage data, such as personal computers, servers, and etc. The servers include, but not limited to, a single server, a cluster of servers, a cloud server, etc.

It should be noted that, in other embodiments, at least one of firefighting condition data, firefighting input data and firefighting damage data can be stored in the terminal device 1.

Figure 2:
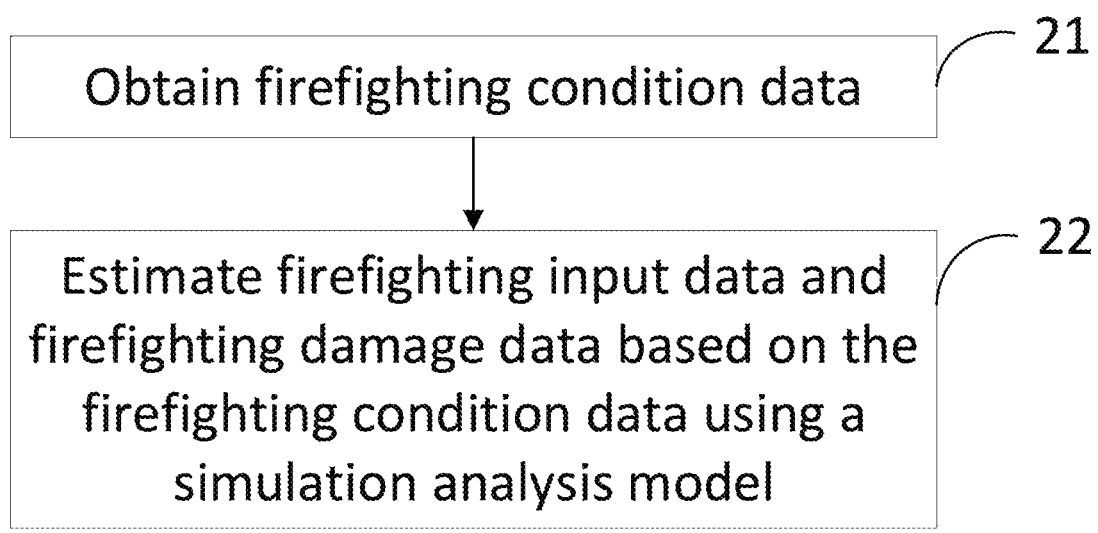
FIG. 2 illustrates an embodiment of a flowchart of a method for estimating firefighting data.

FIG. 2 illustrates a flowchart of one embodiment of a method for estimating firefighting data of the present disclosure. The method is applied to a terminal device. For a computer device that needs to perform firefighting data estimating function, the function for estimating firefighting data provided by the method of the present disclosure can be directly integrated on the computer device, or run on the computer device in the form of a software development kit (SDK).

Referring to FIG. 2, the method is provided by way of example, as there are a variety of ways to carry out the method. Each block shown in FIG. 2 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block 21

At block 21, the terminal device obtains firefighting condition data of a specific site.

The firefighting condition data includes a number of evacuees, environment condition data, and article condition data. The environment condition data can include, but not limited to fixed fire facilities information and mobile fire facilities information, such as number and location of fire alarms, smoke alarms, ceiling sprinkler heads, fire detectors, indoor and outdoor hydrants. The article condition data can include, but not limited to, inflammable items located in the specific site, such as manufacturing equipment, materials, office computers, furniture, etc.

In an embodiment, the firefighting condition data can be obtained by receiving user input information on firefighting condition, such as the number of evacuees, types, and quantities of firefighting facilities and inflammable articles.

In at least one embodiment, the firefighting condition data can be obtained by obtaining pictures taken by cameras located in the specific site, and determining firefighting condition data including the number of evacuees, types, and quantities of firefighting facilities and inflammable articles, by an image recognition method based on the pictures.

At block 22, the terminal device estimates firefighting input data and firefighting damage data based on the firefighting condition data.

In detail, the terminal device input firefighting condition data into a predetermined simulation analysis model and obtain firefighting input data and firefighting damage data with the least total cost. The total cost is a sum of firefighting investment and firefighting damage.

The establishment of the predetermined simulation analysis model can include the following actions including (1)-(7). In other embodiments, additional actions can be added or fewer actions can be utilized without departing from this disclosure. The predetermined simulation analysis model can be established online or offline. In at least one embodiment, the predetermined simulation analysis model can be established in the terminal device, or in a computer device (for example, the computer device 2 shown in FIG. 1 in communication with the terminal device.

(1). obtaining and storing firefighting condition data, firefighting input data and firefighting damage data of different sites.

Obtaining firefighting condition data, firefighting input data and firefighting damage data of different sites incudes:

(a). obtaining firefighting condition data of a site and determining whether the firefighting condition data meets predetermined safety standards. The safety standards can be stored as a specific table, which specifies one or more parameters and corresponding parameter values or parameter value ranges. The parameters can include, but not limited to, the number of fire alarms and the number of sprinkler heads on the ceiling per unit area; the number of personnel per unit area, the number of fire extinguishers and gas masks matching the number of personnel; the number of inflammable articles per unit area and the number of hydrants and fire extinguishers matching the inflammable articles.

(b). If the firefighting condition data meets the safety standards, calculating firefighting input data and firefighting damage data based on the firefighting condition data.

The firefighting input data represents a sum of input cost of all firefighting equipment located on the site. Calculating the firefighting input data includes: determining firefighting equipment located in the site and the values of the firefighting equipment; calculating the firefighting input data based on the values of firefighting equipment.

The firefighting damage data can be amount of loss from the fire. The firefighting damage data can be a sum of firefighting damage data of each combustible articles located on the site. Calculating the firefighting damage data of a combustible article includes: determining firefighting equipment located in the site and the values of the firefighting equipment; calculating the firefighting input data based on the values of firefighting equipment; calculating the firefighting damage data of the site includes: determining the value of the combustible article; dividing the combustible article into a plurality of blocks according to a preset proportion; determining a burning time of each block and a possible burning time of the combustible article assumed in the case of fire; and calculating firefighting damage data of the combustible article based on the value of the combustible article and the possible burning time of the combustible article assumed in the case of fire. The possible burning time of the combustible article can be obtained by simulation of fire condition.

For example, a machine is valued $640,000 and can be divided into 64 blocks. Burning time of each block is 2 minutes. According to the firefighting condition data, burning time of the machine can be determined, thus the firefighting damage data can be determined. The burning time can be determined based on the time period from the time when the fire starts to the time when the fire is under control. The burning time can be simulated in different firefighting condition, for example, if there is a ceiling sprinkler head in the site, or there is only a fire extinguisher in the site. For example, in a firefighting condition where there is only a fire extinguisher, the possible burning time may be 8 minutes, the firefighting damage data can be ($640,000/64)*(8/2) =$40000. Therefore, the firefighting damage data in different firefighting condition can be estimated in said way.

(2). Using the firefighting condition data, the firefighting input data and the firefighting damage data of different sites to construct a training set and a verification set. The training set includes firefighting condition data corresponding to different sites. The verification set includes firefighting input data and firefighting damage data corresponding to different sites.

(3). Establishing a neural network-based analysis model, and training parameters of the neural network-based analysis model using the training set and the verification set. The firefighting condition data is used as input data of the neural network-based analysis model, and output data of the neural network-based analysis model includes firefighting input data and firefighting damage data.

(4). Verifying the neural network-based analysis model using the verification set, and calculating prediction accuracy of the neural network-based analysis model based on the output of the model and the verification set.

(5). Determining whether the prediction accuracy of the neural network-based analysis model is less than a preset value.

(6). Taking the neural network-based analysis model as the predetermined simulation analysis model, if the prediction accuracy of the neural network-based analysis model is not less than the preset value.

(7) Correcting the neural network-based analysis model and training the corrected neural network-based analysis model using the training set and the verification set, if the prediction accuracy of the neural network-based analysis model is less than the preset value. Correction of the neural network-based analysis model includes correcting structure of the neural network-based analysis model, for example, the number of convolution nuclei, the number of elements in the pooling layer, and at least one of the elements in the fully connected layer.

(8). Verifying the corrected neural network-based analysis model using the verification set, calculating prediction accuracy of the corrected neural network-based analysis model based on the output of the model and the verification set, and taking the corrected neural network-based analysis model is used as the predetermined simulation analysis model if the prediction accuracy of the corrected neural network-based analysis model is not less than the preset value.

If the prediction accuracy of the neural network-based analysis model is less than the preset value, (7) and (8) can be repeated until the prediction accuracy of the corrected neural network-based analysis model is not less than the preset value.

In at least one embodiment, the method further including: performing normalization of the firefighting condition data. That is, the firefighting condition data is transformed into values between 0 and 1 according to a preset transformation rule.

For example, if the maximum value of the number of evacuees preset in the simulation analysis model is 2000, the number of evacuees of the site is 500, the number of evacuees of the site can be transformed to a ratio of the number of evacuees of the site and the maximum value of the number of evacuees, 500/2000=0.4.

if the maximum value of the number of ceiling sprinkler head preset in the simulation analysis model is 1000, the number of ceiling sprinkler head of the site is 100, the number of ceiling sprinkler head of the site can be transformed to a ratio of the number of ceiling sprinkler head of the site and the maximum value of the number of ceiling sprinkler head, 100/1000=0.1.

In a similar way, all parameters value included in the firefighting condition data can be transformed into a value between 0 and 1.

When the firefighting condition data is inputted into the simulation analysis model, the model will output a normalized value of an estimated firefighting input data and a normalized value of an estimated firefighting damage data. The normalized value of estimated firefighting input data and the normalized value of the estimated firefighting damage data can be transformed to corresponding original values by the corresponding reverse transformation. For example, if the normalized value of an estimated firefighting input data is 0.3, and the normalized value of an estimated firefighting damage data is 0.5, the maximum value of the firefighting input data preset in the simulation analysis model is 3000 and the maximum value of the firefighting damage data preset in the simulation analysis model is 5000, the estimated firefighting input data can be 900 (3000*0.3), and the estimated firefighting damage data can be 2500 (5000*0.5).

In at least one embodiment, the block 22 further includes: determining whether the estimated firefighting input data is less than the firefighting input data of the site. If the estimated firefighting input data is less than the firefighting input data of the site, generating a message indicating that the firefighting input data of the site is too high. If the estimated firefighting input data is bigger than the firefighting input data of the site, generating a message indicating that the firefighting input data of the site is too low.

In at least one embodiment, the block 22 further includes: if the estimated firefighting input data is bigger than the firefighting input data of the site, generating an improvement suggestion.

In at least one embodiment, generating the improvement suggestion can include: determining whether the firefighting condition data of the site meets predetermined safety standards, if not, generating the improvement suggestion based on the predetermined safety standards.

In detail, the predetermined safety standards indicate a number of firefighting equipment in per unit area, such as fire alarms, ceiling fire sprinkler heads, fire extinguishers, gas masks. If the corresponding number of firefighting equipment of the site is less than that indicated in the safety standards, the improvement suggestion can indicate that corresponding firefighting equipment should be added to the site. For example, if the safety standards indicate a number of fire extinguishers is 5, while the fire extinguishers in the site is 3, the improvement suggestion can be two more fire extinguishers should be added.

It should be noted that, the generation of the simulation analysis model can be performed in a computer device (eg, the computer device 2 in communication with the terminal device).

Figure 3:
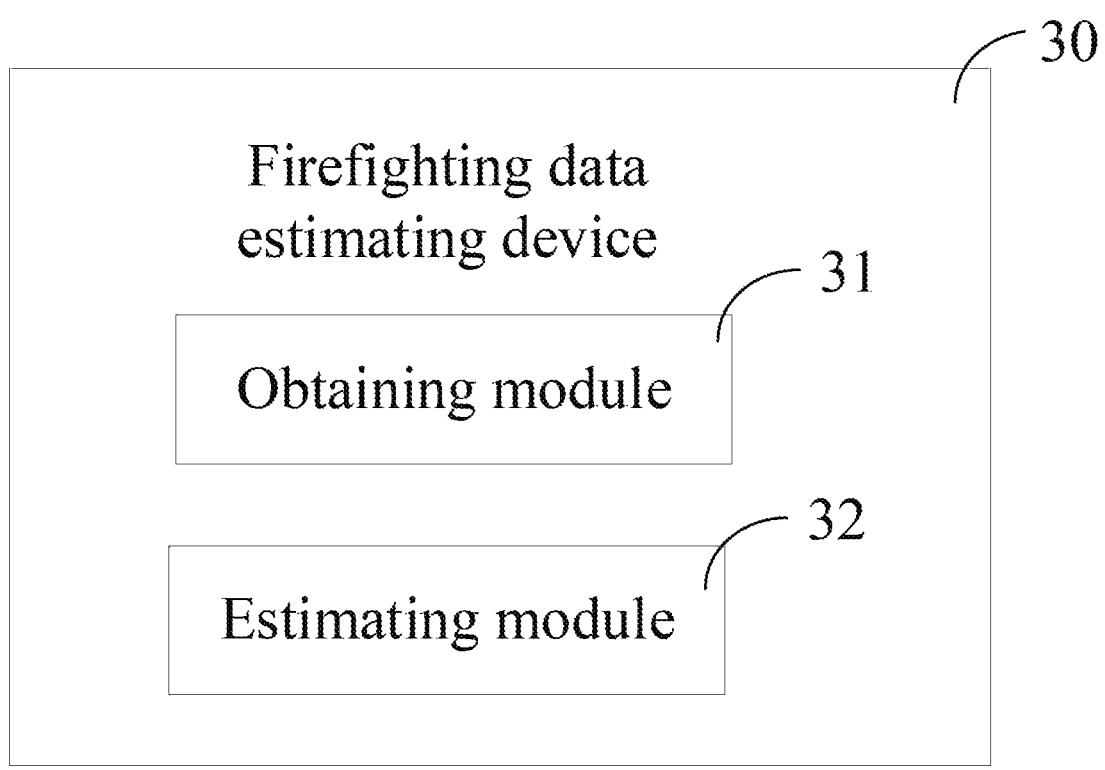
FIG. 3 shows an embodiment of modules of a firefighting data estimating device.
Figure 4:
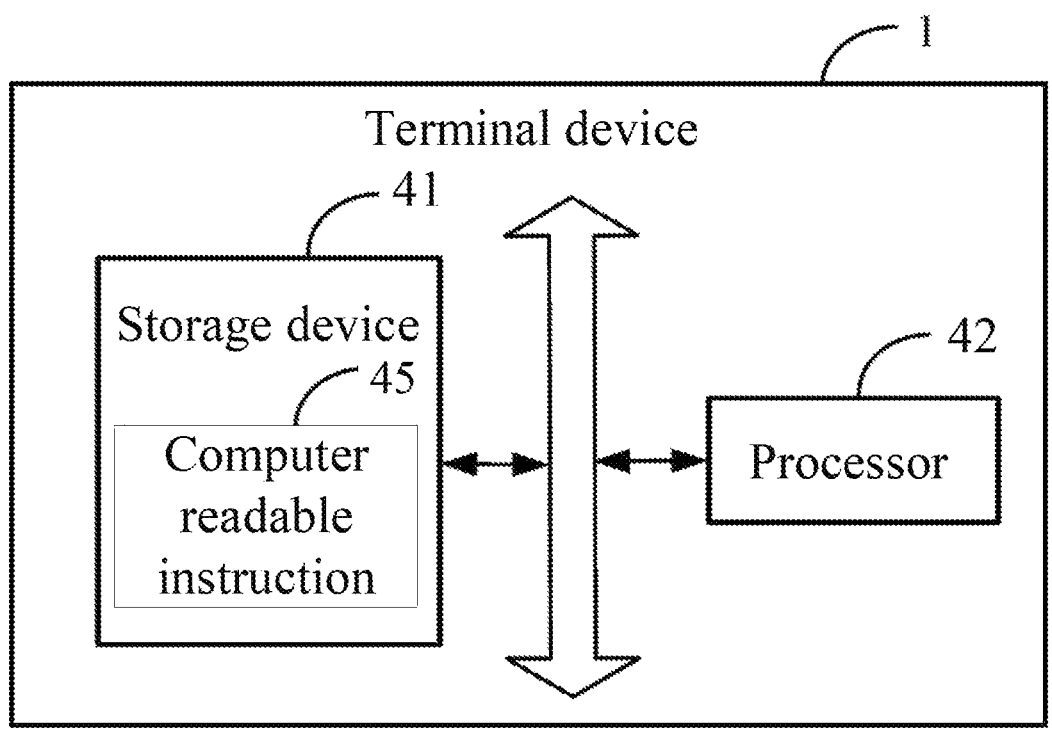
FIG. 4 shows one embodiment of a schematic structural diagram of a computer device.

FIG. 2 shows an exemplary embodiment of the firefighting data estimating method, the following is an introduction to the functional modules that implements the firefighting data estimating method and the hardware device architecture that implements the firefighting data estimating method in combination with FIGS. 3-4.

FIG. 3 shows an exemplary embodiment of modules of firefighting data estimating device.

In at least one embodiment, the firefighting data estimating device 30 can apply in a terminal device or a computer device. The firefighting data estimating device 30 can include a plurality of functional modules consisting of program code segments. The program code of each program segment in the firefighting data estimating device 30 may be stored in a storage device of the server and executed by the at least one processor to perform the firefighting data estimating method (described in detail in FIG. 2).

In at least one embodiment, the firefighting data estimating device 30 can include a plurality of modules. The plurality of modules can include, but is not limited to, an obtaining module 31, and an estimating module 32. The modules 31-32 can include computerized instructions in the form of one or more computer-readable programs that can be stored in the non-transitory computer-readable medium (e.g., the storage device of the computer device), and executed by the at least one processor of the computer device to implement the firefighting data estimating method (e.g., described in detail in FIG. 2).

The obtaining module 31 is configured to obtain firefighting condition data of a specific site.

The firefighting condition data includes a number of evacuees, environment condition data, and article condition data. The environment condition data can include, but not limited to fixed firefighting equipment information and mobile firefighting equipment information, such as number and location of fire alarms, smoke alarms, ceiling sprinkler heads, fire detectors, indoor and outdoor hydrants. The article condition data can include, but not limited to, inflammable items located in the specific site, such as manufacturing equipment, materials, office computers, furniture, etc.

In an embodiment, the firefighting condition data can be obtained by receiving user input information on firefighting condition, such as the number of evacuees, types, and quantities of firefighting facilities and inflammable articles.

In at least one embodiment, the firefighting condition data can be obtained by obtaining pictures taken by cameras located in the specific site, and determining firefighting condition data including the number of evacuees, types, and quantities of firefighting facilities and inflammable articles, by an image recognition method based on the pictures.

The estimating module 32 is configured to estimate firefighting input data and firefighting damage data based on the firefighting condition data.

In detail, the estimating module 32 is configured to input the firefighting condition data into a predetermined simulation analysis model and obtain firefighting input data and firefighting damage data with the least total cost. The total cost is a sum of firefighting input and firefighting damage.

The establishment of the predetermined simulation analysis model can include the following actions including (1)-(7). In other embodiments, additional actions can be added or fewer actions can be utilized without departing from this disclosure. The predetermined simulation analysis model can be established online or offline. In at least one embodiment, the predetermined simulation analysis model can be established in the terminal device, or in a computer device (for example, the computer device 2 shown in FIG. 1 in communication with the terminal device.

(1). obtaining and storing firefighting condition data, firefighting input data, and firefighting damage data of different sites.

Obtaining firefighting condition data, firefighting input data and firefighting damage data of different sites incudes:

(a). obtaining firefighting condition data of a site, and determining whether the firefighting condition data meets predetermined safety standards. The safety standards can be stored as a specific table, which specifies one or more parameters and corresponding parameter values or parameter value ranges. The parameters can include, but not limited to, the number of fire alarms and the number of sprinkler heads on the ceiling per unit area; the number of personnel per unit area, the number of fire extinguishers and gas masks matching the number of personnel; the number of inflammable articles per unit area and the number of hydrants and fire extinguishers matching the inflammable articles.

(b). If the firefighting condition data meets the safety standards, calculating firefighting input data and firefighting damage data based on the firefighting condition data.

The firefighting input data represents a sum of input cost of all firefighting equipment located on the site. Calculating the firefighting input data includes: determining firefighting equipment located in the site and the values of the firefighting equipment; calculating the firefighting input data based on the values of firefighting equipment.

The firefighting damage data can be the amount of loss from the fire. The firefighting damage data can be a sum of firefighting damage data of each combustible articles located on the site. Calculating the firefighting damage data of a combustible article includes: determining the burning time of the combustible article, dividing the combustible article into a plurality of blocks according to a preset proportion of the burning time. Each block represents damage data in a time unit due to the combustible article being burned.

For example, a machine is valued $640,000 and can be divided into 64 blocks. Burning time of each block is 2 minutes. According to the firefighting condition data, the burning time of the machine can be determined, thus the firefighting damage data can be determined. The burning time can be determined based on the time period from the time when the fire stars to the time when the fire is under control. The burning time can be simulated in different firefighting conditions, for example, if there is a ceiling sprinkler head in the site, or there is only a fire extinguisher in the site. Therefore, the firefighting damage data in different firefighting condition can be estimated in said way.

(2). The firefighting condition data, the firefighting input data and the firefighting damage data of different sites can be used to construct a training set and a verification set. The training set includes firefighting condition data corresponding to different sites. The verification set includes firefighting input data and firefighting damage data corresponding to different sites.

(3). Establishing a neural network-based analysis model, and training parameters of the neural network-based analysis model using the training set and the verification set. The firefighting condition data is used as input data of the neural network-based analysis model, and output data of the neural network-based analysis model includes firefighting input data and firefighting damage data.

(4). Verifying the neural network-based analysis model using the verification set, and calculating prediction accuracy of the neural network-based analysis model based on the output of the model and the verification set.

(5). Determining whether the prediction accuracy of the neural network-based analysis model is less than a preset value.

(6). Taking the neural network-based analysis model as the predetermined simulation analysis model, if the prediction accuracy of the neural network-based analysis model is not less than the preset value.

(7) Correcting the neural network-based analysis model and training the corrected neural network-based analysis model using the training set and the verification set, if the prediction accuracy of the neural network-based analysis model is less than the preset value. Correction of the neural network-based analysis model includes correcting structure of the neural network-based analysis model, for example, the number of convolution nuclei, the number of elements in the pooling layer, and at least one of the elements in the fully connected layer.

(8). Verifying the corrected neural network-based analysis model using the verification set, calculating prediction accuracy of the corrected neural network-based analysis model based on the output of the model and the verification set, and taking the corrected neural network-based analysis model is used as the predetermined simulation analysis model if the prediction accuracy of the corrected neural network-based analysis model is not less than the preset value.

If the prediction accuracy of the neural network-based analysis model is less than the preset value, (7) and (8) can be repeated until the prediction accuracy of the corrected neural network-based analysis model is not less than the preset value.

In at least one embodiment, the method further including: performing normalization of the firefighting condition data. That is, the firefighting condition data is transformed into values between 0 and 1 according to a preset transformation rule.

For example, if the maximum value of the number of evacuees preset in the simulation analysis model is 2000, the number of evacuees of the site is 500, the number of evacuees of the site can be transformed to a ratio of the number of evacuees of the site and the maximum value of the number of evacuees, 500/2000=0.4.

if the maximum value of the number of ceiling sprinkler head preset in the simulation analysis model is 1000, the number of ceiling sprinkler head of the site is 100, the number of ceiling sprinkler head of the site can be transformed to a ratio of the number of ceiling sprinkler head of the site and the maximum value of the number of ceiling sprinkler head, 100/1000=0.1.

In a similar way, all parameters value included in the firefighting condition data can be transformed into a value between 0 and 1.

When the firefighting condition data is inputted into the simulation analysis model, the model will output a normalized value of an estimated firefighting input data and a normalized value of an estimated firefighting damage data. The normalized value of estimated firefighting input data and the normalized value of the estimated firefighting damage data can be transformed into the corresponding original values by the corresponding reverse transformation. For example, if the normalized value of an estimated firefighting input data is 0.3, and the normalized value of an estimated firefighting damage data is 0.5, the maximum value of the firefighting input data preset in the simulation analysis model is 3000 and the maximum value of the firefighting damage data preset in the simulation analysis model is 5000, the estimated firefighting input data can be 900 (3000*0.3), and the estimated firefighting damage data can be 2500 (5000*0.5).

In at least one embodiment, the estimating module is further configured to: determine whether the estimated firefighting input data is less than the firefighting input data of the site. If the estimated firefighting input data is less than the firefighting input data of the site, the estimating module is further configured to generate a message indicating that the firefighting input data of the site is too high. If the estimated firefighting input data is bigger than the firefighting input data of the site, the estimating module is further configured to generate a message indicating that the firefighting input data of the site is too low.

In at least one embodiment, the estimating module is further configured to: generate an improvement suggestion, if the estimated firefighting input data is bigger than the firefighting input data of the site.

In at least one embodiment, to generate the improvement suggestion can include: determining whether the firefighting condition data of the site meets predetermined safety standards, if not, generating the improvement suggestion based on the predetermined safety standards.

In detail, the predetermined safety standards indicate a number of firefighting equipment in per unit area, such as fire alarms, ceiling fire sprinkler heads, fire extinguishers, gas masks. If the corresponding number of firefighting equipment of the site is less than that indicated in the safety standards, the improvement suggestion can indicate that corresponding firefighting equipment should be added to the site. For example, if the safety standards indicate a number of fire extinguishers is 5, while the fire extinguishers in the site is 3, the improvement suggestion can be two more fire extinguishers should be added.

FIG. 4 shows one embodiment of a schematic structural diagram of a terminal device 1. In an embodiment, the terminal device 1 includes a storage device 41 and at least one processor 42. The terminal device 1 further can include at least one computer readable instruction 45, stored in the storage device 41, and executable on the processor 42. When the processor 42 executes the computer readable instruction 45, the firefighting data estimating method are implemented, for example, blocks 21-22 shown in FIG. 2.

In at least one embodiment, the computer readable instruction 45 can be partitioned into one or more modules/units that are stored in the storage device 41 and executed by the processor 42. The one or more modules/units may be a series of computer program instruction segments capable of performing a particular function for describing the execution of the computer readable instruction 45 in the terminal device 1.

In at least one embodiment, the terminal device 1 is a device, the hardware thereof includes but is not limited to a microprocessor and an application specific integrated circuit (ASIC), Field-Programmable Gate Array (FPGA), Digital Signal Processor (DSP), embedded devices, etc. It can be understood by those skilled in the art that the schematic diagram is merely an example of the terminal device 1, it does not constitute a limitation of the terminal device 1, other examples may include more or less components than those illustrated, or combine some components, or different components. For example, the terminal device 1 may further include an input/output device, a network access device, a bus, and the like.

In some embodiments, the at least one processor 42 may be a central processing unit (CPU), and may also include other general-purpose processors, digital signal processors (DSPs), application specific integrated circuits (ASICs), and off-the-shelf programmable gate arrays, Field-Programmable Gate Array (FPGA) or other programmable logic devices, discrete gate, or transistor logic device, discrete hardware components, etc. The general-purpose processor may be a microprocessor or the processor may be any conventional processor or the like. The processor 42 is the control center of the terminal device 1, and connects sections of the entire terminal device 1 with various interfaces and lines.

In some embodiments, the storage device 41 can be used to store program codes of computer readable programs and various data, such as the firefighting data estimating device 30 installed in the terminal device 1. The storage device 41 can include a read-only memory (ROM), a random access memory (RAM), a programmable read-only memory (PROM), an erasable programmable read only memory (EPROM), a one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other storage medium readable by the terminal device 1.

The modules/units integrated by the terminal device 1 can be stored in a computer readable storage medium if implemented in the form of a software functional unit and sold or used as a stand-alone product. The present disclosure implements all or part of the processes in the foregoing embodiments, and a computer program may also instruct related hardware. The computer program may be stored in a computer readable storage medium. The steps of the various method embodiments described above may be implemented by a computer program when executed by a processor. Wherein, the computer program comprises computer program code, which may be in the form of source code, product code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM), random access memory (RAM), electrical carrier signals, telecommunications signals, and software distribution media. It should be noted that the content contained in the computer readable medium may be increased or decreased according to the requirements of legislation and patent practice in a jurisdiction, for example, in some jurisdictions, computer-readable media does not include electrical carrier signals and telecommunication signals.

The above description only describes embodiments of the present disclosure, and is not intended to limit the present disclosure, various modifications and changes can be made to the present disclosure. Any modifications, equivalent substitutions, improvements, etc. made within the spirit and scope of the present disclosure are intended to be included within the scope of the present disclosure.

What is claimed is:

1. A firefighting data estimating method, comprising:

obtaining firefighting condition data of a site, wherein the firefighting condition data is provided with information on firefighting equipment and information on flammable articles;

creating a simulation analysis model, comprising:

obtaining and storing firefighting condition data, firefighting input data and firefighting damage data of different sites;

using the firefighting condition data, the firefighting input data and the firefighting damage data of different sites to construct a training set and a verification set, wherein the firefighting input data is used to construct the training set, the firefighting input data and the firefighting damage data is used to construct the verification set;

verifying a neural network-based analysis model using the verification set, and calculating prediction accuracy of the neural network-based analysis model based on output of the neural network-based analysis model and the verification set;

determining whether the prediction accuracy of the neural network-based analysis model is less than a preset value;

taking the neural network-based analysis model as a predetermined simulation analysis model, if the prediction accuracy of the neural network-based analysis model is not less than the preset value;

correcting the neural network-based analysis model and training a corrected neural network-based analysis model using the training set and the verification set, if the prediction accuracy of the neural network-based analysis model is less than the preset value; wherein correcting the neural network-based analysis model further comprises correcting number of convolution nuclei, number of elements in a pooling layer, and at least one element in a fully connected layer in the neural network-based analysis model;

verifying the corrected neural network-based analysis model using the verification set, calculating prediction accuracy of the corrected neural network-based analysis model based on output of the corrected neural network-based analysis model and the verification set; and taking the corrected neural network-based analysis model as the predetermined simulation analysis model, if the prediction accuracy of the corrected neural network-based analysis model is not less than the preset value; and repeating correcting and verifying the corrected neural network-based analysis model, if the prediction accuracy of the corrected neural network-based analysis model is less than the preset value, until the prediction accuracy of the corrected neural network-based analysis model is not less than the preset value;

performing a normalization of the firefighting condition data, and transforming the firefighting condition data into values between 0 and 1 according to a preset transformation rule;

estimating the firefighting input data and the firefighting damage data based on the firefighting condition data using the simulation analysis model, comprising: outputting a normalized value of an estimated firefighting input data and a normalized value of an estimated firefighting damage data by using the simulation analysis model; and transforming the normalized value of the estimated firefighting input data, and the normalized value of the estimated firefighting damage data into corresponding original values by a corresponding reverse transformation of the preset transformation rule.

2. The method according to claim 1, wherein the method further comprising:

determining whether the firefighting input data estimated by the simulation analysis model is less than the firefighting input data of the site;

generating a message indicating the firefighting input data is high, if the firefighting input data estimated by the simulation analysis model is less than the firefighting input data of the site; and generating a message indicating the firefighting input data is low, if the firefighting input data estimated by the simulation analysis model is bigger than the firefighting input data of the site.

3. The method according to claim 2, wherein the method further comprising:

generating an improvement suggestion indicating which firefighting equipment should be added to the site, if the firefighting input data estimated by the simulation analysis model is bigger than the firefighting input data of the site;

wherein the improvement suggestion is generated based on preset safety standards.

4. The method according to claim 1, wherein obtaining the firefighting condition data, the firefighting input data and the firefighting damage data of different sites further comprising:

determining whether the firefighting condition data meets preset safety standards;

calculating the firefighting input data and the firefighting damage data of the site based on the firefighting condition data of the site, if the firefighting condition data meets the preset safety standards, wherein the firefighting input data represents investment on firefighting equipment, and the firefighting damage data represents damage assumed in case of fire.

5. The method according to claim 4, wherein calculating the firefighting input data of the site further comprises:

determining the firefighting equipment located in the site and values of the firefighting equipment;

calculating the firefighting input data based on the values of firefighting equipment.

6. The method according to claim 4, wherein calculating the firefighting damage data of the site further comprises:

determining value of combustible article;

dividing the combustible article into a plurality of blocks according to a preset proportion;

determining a burning time of each of the plurality of blocks and a possible burning time of the combustible article assumed in the case of fire; and calculating firefighting damage data of the combustible article based on the value of the combustible article and the possible burning time of the combustible article assumed in the case of fire.

7. The method according to claim 1, wherein obtaining firefighting condition data of the site further comprises:

obtaining pictures taken by cameras located in the site, and determining the firefighting condition data including number of evacuees, types and quantities of firefighting equipment and combustible articles, by an image recognition method based on the pictures.

8. A terminal device, comprising:
a storage device;
at least one processor; and
the storage device storing one or more programs that, when executed by the at least one processor, cause the at least one processor to:
obtain firefighting condition data of a site, wherein the firefighting condition data is provided with information on firefighting equipment and information on flammable articles;
create a simulation analysis model, wherein creation of the simulation analysis model comprises:
   obtaining and storing the firefighting condition data, firefighting input data and firefighting damage data of different sites;
   using the firefighting condition data, the firefighting input data and the firefighting damage data of different sites to construct a training set and a verification set, wherein the firefighting input data is used to construct the training set, the firefighting input data and the firefighting damage data is used to construct the verification set;
   verifying a neural network-based analysis model using the verification set, and calculating prediction accuracy of the neural network-based analysis model based on output of the neural network-based analysis model and the verification set;
   determining whether the prediction accuracy of the neural network-based analysis model is less than a preset value;
   taking the neural network-based analysis model as a predetermined simulation analysis model, if the prediction accuracy of the neural network-based analysis model is not less than the preset value;
   correcting the neural network-based analysis model and training a corrected neural network-based analysis model using the training set and the verification set, if the prediction accuracy of the neural network-based analysis model is less than the preset value; wherein correcting the neural network-based analysis model further comprises correcting number of convolution nuclei, number of elements in a pooling layer, and at least one element in a fully connected layer in the neural network-based analysis model;
   verifying the corrected neural network-based analysis model using the verification set, calculating prediction accuracy of the corrected neural network-based analysis model based on output of the corrected neural network-based analysis model and the verification set; and
   taking the corrected neural network-based analysis model as the predetermined simulation analysis model, if the prediction accuracy of the corrected neural network-based analysis model is not less than the preset value; and
   repeating correcting and verifying the corrected neural network-based analysis model, if the prediction accuracy of the corrected neural network-based analysis model is less than the preset value, until the prediction accuracy of the corrected neural network-based analysis model is not less than the preset value;

perform a normalization of the firefighting condition data, and transform the firefighting condition data into values between 0 and 1 according to a preset transformation rule;
estimate the firefighting input data and the firefighting damage data based on the firefighting condition data using the simulation analysis model, comprising: outputting a normalized value of an estimated firefighting input data and a normalized value of an estimated firefighting damage data by using the simulation analysis model; and
transform the normalized value of the estimated firefighting input data, and the normalized value of the estimated firefighting damage data into corresponding original values by a corresponding reverse transformation of the preset transformation rule.

9. The terminal device according to claim 8, wherein the at least one processor is further caused to:
determine whether the firefighting input data estimated by the simulation analysis model is less than the firefighting input data of the site;
generate a message indicating the firefighting input data is high, if the firefighting input data estimated by the simulation analysis model is less than the firefighting input data of the site; and
generate a message indicating the firefighting input data is low, if the firefighting input data estimated by the simulation analysis model is bigger than the firefighting input data of the site.

10. The terminal device according to claim 9, wherein the at least one processor is further caused to:
generate an improvement suggestion indicating which firefighting equipment should be added to the site, if the firefighting input data estimated by the simulation analysis model is bigger than the firefighting input data of the site;
wherein the improvement suggestion is generated based on preset safety standards.

11. The terminal device according to claim 8, wherein obtaining the firefighting condition data, the firefighting input data and firefighting damage data of different sites further comprising:
determining whether the firefighting condition data meets preset safety standards;
calculating the firefighting input data and the firefighting damage data of the site based on the firefighting condition data of the site, if the firefighting condition data meets the preset safety standards, wherein the firefighting input data represents investment on firefighting equipment, and the firefighting damage data represents damage assumed in case of fire.

12. The terminal device according to claim 11, wherein calculating the firefighting input data of the site further comprises: determining the firefighting equipment located in the site and the values of the firefighting equipment; calculating the firefighting input data based on values of firefighting equipment.

13. The terminal device according to claim 11, wherein calculating the firefighting damage data of the site further comprises: determining value of combustible article; dividing the combustible article into a plurality of blocks according to a preset proportion; determining a burning time of each of the plurality of blocks and a possible burning time of the combustible article assumed in the case of fire; and calculating firefighting damage data of the combustible article based on the value of the combustible article and the possible burning time of the combustible article assumed in the case of fire.

14. The terminal device according to claim 8, wherein obtaining the firefighting condition data of the site comprises: obtaining pictures taken by cameras located in the site, and determining the firefighting condition data including number of evacuees, types and quantities of firefighting equipment and combustible articles, by an image recognition method based on the pictures.

15. A non-transitory storage medium having stored thereon instructions that, when executed by a processor of a terminal device, causes the processor to perform firefighting data estimating method, the method comprising:

obtaining firefighting condition data of a site, wherein the firefighting condition data is provided with information on firefighting equipment and information on flammable articles;

creating a simulation analysis model, comprising:

obtaining and storing the firefighting condition data, firefighting input data and firefighting damage data of different sites;

using the firefighting condition data, the firefighting input data and the firefighting damage data of different sites to construct a training set and a verification set, wherein the firefighting input data is used to construct the training set, the firefighting input data and the firefighting damage data is used to construct the verification set;

verifying a neural network-based analysis model using the verification set, and calculating prediction accuracy of the neural network-based analysis model based on output of the neural network-based analysis model and the verification set;

determining whether the prediction accuracy of the neural network-based analysis model is less than a preset value;

taking the neural network-based analysis model as the predetermined simulation analysis model, if the prediction accuracy of the neural network-based analysis model is not less than the preset value;

correcting the neural network-based analysis model and training a corrected neural network-based analysis model using the training set and the verification set, if the prediction accuracy of the neural network-based analysis model is less than the preset value; wherein correcting the neural network-based analysis model further comprises correcting number of convolution nuclei, number of elements in a pooling layer, and at least one element in a fully connected layer in the neural network-based analysis model;

verifying the corrected neural network-based analysis model using the verification set, calculating prediction accuracy of the corrected neural network-based analysis model based on output of the corrected neural network-based analysis model and the verification set; and taking the corrected neural network-based analysis model as the predetermined simulation analysis model, if the prediction accuracy of the corrected neural network-based analysis model is not less than the preset value; and repeating correcting and verifying the corrected analysis model, if the prediction accuracy of the corrected neural network-based analysis model is less than the preset value, until the prediction accuracy of the corrected neural network-based analysis model is not less than the preset value;

performing a normalization of the firefighting condition data, and transforming the firefighting condition data into values between 0 and 1 according to a preset transformation rule;

estimating the firefighting input data and the firefighting damage data based on the firefighting condition data using the simulation analysis model, comprising: outputting a normalized value of an estimated firefighting input data and a normalized value of an estimated firefighting damage data by using the simulation analysis model; and transforming the normalized value of the estimated firefighting input data, and the normalized value of the estimated firefighting damage data into corresponding original values by a corresponding reverse transformation of the preset transformation rule.

\* \* \* \* \*